(No Model.)

W. M. THOMAS.
ELECTRIC CUT-OUT.

No. 291,958. Patented Jan. 15, 1884.

WITNESSES
Wm A. Skinkle
Edwin A. Newman

INVENTOR
William M. Thomas
By his Attorneys
Baldwin Hopkins, & Peyton

N. PETERS, Photo-Lithographer, Washington, D. C.

UNITED STATES PATENT OFFICE.

WILLIAM M. THOMAS, OF GRAND RAPIDS, MICHIGAN, ASSIGNOR OF ONE-HALF TO THE GRAND RAPIDS ELECTRIC LIGHT AND POWER COMPANY, OF SAME PLACE.

ELECTRIC CUT-OUT.

SPECIFICATION forming part of Letters Patent No. 291,958, dated January 15, 1884.

Application filed October 12, 1883. (No model.)

*To all whom it may concern:*

Be it known that I, WILLIAM M. THOMAS, of Grand Rapids, in the county of Kent and State of Michigan, have invented a certain new and useful Automatic Cut-Out for Electric Lighting and other Electric Circuits, of which the following is a specification, reference being had to the accompanying drawings.

My invention consists of an apparatus to be used in connection with electric light and other electric circuits which enter buildings and other structures, for the purpose of protecting the buildings, &c., from injury which might occur from contact or close proximity of the prime or proper conductor with other conductors—such as gas-pipes, iron columns, telegraph and telephone wires—which are common in buildings.

Accidental contacts with conductors about buildings will produce what are known as "short-circuits" and "ground-connections," and sometimes result in setting fire to buildings, either by the electricity normally in the circuit or by lightning during a storm, because gas-pipes and other electrical conductors are not properly insulated from the combustible portions of buildings.

It is the object of my invention to prevent accidents due to the diversion of electric currents from their proper course, and thereby not only secure the safety of buildings, but prevent lamps from being cut out of circuit and extinguished and prevent injury to electric generators.

Figure 1:
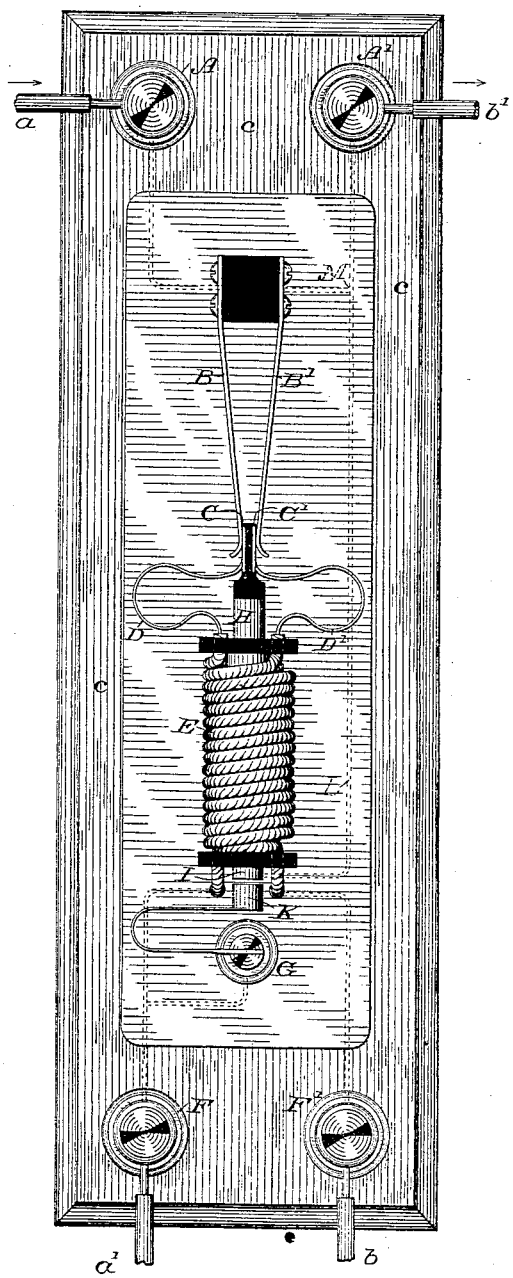
Figure 2:

In the drawings, Figure 1 is a plan of a part of an electrical apparatus through which a circuit of conductors passes, and in which my invention is exhibited; and Fig. 2 shows a movable sliding core and a stationary core within a hollow magnetic spool detached from the apparatus, the whole, when the spool is wound with insulated wire, as shown in Fig. 1, constituting an electro-magnet.

$a$ indicates an electric conductor, which may be supposed to come from any suitable source of electrical supply and pass through, by suitable electric connections, the apparatus shown in Fig. 1. It is continued at $a'$, whence it may be supposed to pass into a building through a lamp or lamps, and out again to $b$, thence back through the apparatus illustrated in Fig. 1 to $b'$, whence it may be continued on, and finally complete the circuit by ground-connection or otherwise.

The apparatus shown in Fig. 1 may be supposed to be outside of a building, and consists of devices adapted to cut the circuit out of the building whenever an accidental contact or connection is made with any conductor in the building.

$c$ indicates any suitable support or bed-plate for the apparatus, which, in general terms, consists of an electro-magnet and appurtenances placed in the circuit outside of a building, the helix of which magnet is composed of two wires wound parallel and in the same direction, one of these wires forming the conductor through which the current enters the building and the other the conductor through which it leaves the building.

A indicates the binding-post, which receives the positive line-wire, and through which the current passes, as indicated by dotted lines, to a spring, B, which makes contact with a metallic plate, C, thence through a flexible conductor, D, to one of the coils of the helix E, thence, as indicated by dotted lines, to a post, G, and to binding-post F; thence, passing into a building, it may be supposed the conductor returns to the binding-post F', thence, as indicated by dotted lines, to the second wire of the helix, thence through flexible conductor D' to plate C' and spring B', thence, as indicated by dotted lines, to binding-post A'.

H indicates a sliding core within the electro-magnet, which is secured at its outer end to the plates C C', which constitute the terminals of the loop-circuit, and which are normally clamped by the springs B B', which constitute the terminals of the main circuit. The ends of the springs are preferably slightly flared, so that the plates may be readily inserted between them. When the plates are clamped by the springs, the sliding core is partially withdrawn from the electro-magnet, as indicated in the drawings.

I indicates a fixed core, beneath which is a spring-armature, K, connected with the binding-post G.

L indicates an electrical conductor connected with the fixed core I, and joining the main circuit at M, and which is normally inactive.

It is well known that a hollow electro-magnet may be operated to draw into it a core or sliding armature, and it is therefore not necessary to describe this operation or the conditions and principles upon which it depends in detail.

It is obvious, also, that other forms of armatures may be employed; but I prefer that shown.

In view of common knowledge of electricians upon this matter, it is sufficient to say, the plates C and C' being insulated from each other and from the sliding core H, that in the apparatus illustrated in the drawings, if the regular current passes normally upon the proper conductors through the loop into the building and out again to the main line, the cores H and I will remain normal or undisturbed and separated, as indicated in Fig. 3; but should the current be diverted from the loop by a ground or other connection, which would disturb the magnetic equilibrium of cores H and I, it would produce a contact between core I and armature and post G, which would divert the current from or short-circuit the loop in the building. This would direct the current through the post G and the armature to core I, thence out through binding-post A' to the main line, making it travel through only one of the coils of the helix, thus disturbing the equilibrium of the two cores and producing a high magnetic effect. Meanwhile the sliding core H would descend and withdraw the plates C C' from the clasp of the springs B B', when a circuit would be completed through the springs by contact of their lower ends direct to the binding-post A', and thus the loop, running to a given building where a disturbance might occur, would be cut out, and the balance of the series of lamps and the continuity of the circuit would be undisturbed.

Any of the lamps in a loop may be turned on or off, and any number of lamps may be added or removed without disturbing the action of my cut-out or its equilibrium.

I do not confine myself to the exact details of construction and arrangement of parts herein described and illustrated, because the principle of my invention will admit of considerable variation in these matters.

I am aware that a combination of a main circuit, a loop, and an automatic cut-out in the loop is not new; and I do not claim such combination, broadly, my invention being limited to an organization in which means are provided for short-circuiting and cutting out the loop automatically only when the current in the loop is grounded or otherwise diverted from the loop.

Having thus described my invention, what I claim as new, and desire to secure by Letters Patent of the United States, is—

1. The combination of the main circuit, the loop-circuit, and means brought into operation by the diversion of the current from the loop to automatically cut out the loop-circuit, substantially as set forth.

2. The combination of the main circuit, the loop-circuit, and means brought into operation by the diversion of the current from the loop to automatically short-circuit the loop-circuit, substantially as set forth.

3. The combination of the main circuit, the loop-circuit, and means brought into operation by the diversion of the current from the loop to automatically both short-circuit and cut out the loop-circuit, substantially as set forth.

4. The combination of the main circuit, the loop-circuit, the terminals of the two circuits, which are normally electrically connected, and means, substantially such as described, brought into operation by the diversion of the current from the loop, for automatically breaking the connection between the two circuits whenever the current is grounded or otherwise diverted in the loop, thereby cutting out the loop, and at the same time permitting the terminals of the main line to come together, so as to continue the main circuit, substantially as set forth.

5. The combination of the main circuit, the loop-circuit, the terminals of the two circuits, which are normally electrically connected, the electro-magnet, the coils of which are included in the loop-circuit, and which are so disposed that the current which passes through the coils does not normally energize the magnet, but which does energize the magnet whenever the current in the loop is grounded or otherwise diverted, and the armature of the magnet to which the terminals of the loop-circuit are attached, so that when the magnet is energized by reason of a short circuit or ground-connection in the loop it will attract its armature, thereby breaking the connection between the terminals of the two circuits and cutting out the loop, substantially as set forth.

6. The herein-described electrical cut-out apparatus, consisting of the combination of the bed-plate, the terminal springs, the terminal plates normally clamped between the terminal springs, the electro-magnet, the coils of which are wound as described, the armature, the flexible conductors which connect the coils of the electro-magnet with the terminal plates, the binding-posts, and the conductors which lead from one set of binding-posts to the terminal springs and from another set of binding-posts to the coils of the electro-magnet, substantially as set forth.

7. The herein-described electrical cut-out and short-circuiting apparatus, consisting of the combination of the bed-plate, the terminal springs, the terminal plates normally clamped between the terminal springs, the electro-magnet, the cores of which are wound as described, the armature, the flexible conductors that connect the coils of the electro-magnet with the terminal plates, the fixed core of the magnet, its armature, the binding-posts, and the conductors for electrically connecting the terminal springs with one set of binding-posts and the coils of the electro-magnet with another set of binding-posts, the conductor for connecting one of the binding-posts with the fixed core of the magnet, and the conductor for connecting the armature of the fixed core to another of the binding-posts, substantially as set forth.

In testimony whereof I have hereunto subscribed my name this 8th day of October, A. D. 1883.

W. M. THOMAS.

Witnesses:
  WILLIAM E. COX,
  W. F. CHANDLER.